(12) United States Patent
Singh

(10) Patent No.: US 12,167,050 B2
(45) Date of Patent: Dec. 10, 2024

(54) PROXIMITY AND CONTEXT BASED STREAM PLAYBACK CONTROL

(71) Applicant: CITRIX SYSTEMS, INC., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/744,186

(22) Filed: May 13, 2022

(65) Prior Publication Data

US 2023/0370649 A1 Nov. 16, 2023

(51) Int. Cl.
G06F 15/16 (2006.01)
H04L 65/61 (2022.01)
H04N 21/218 (2011.01)

(52) U.S. Cl.
CPC .......... *H04N 21/218* (2013.01); *H04L 65/61* (2022.05)

(58) Field of Classification Search
CPC .............................. H04L 65/61; H04N 21/218
See application file for complete search history.

(56) References Cited

U.S. PATENT DOCUMENTS

| | | | | |
|---|---|---|---|---|
| 6,314,407 B1 * | 11/2001 | Maeno | ................... | G06Q 20/20 705/16 |
| 10,506,073 B1 * | 12/2019 | Mason | ................... | G08C 23/04 |
| 10,762,748 B2 * | 9/2020 | Amaitis | ............... | G07F 17/3276 |
| 10,771,918 B1 * | 9/2020 | Stimpson | ................ | H04L 67/55 |
| 2011/0181496 A1 * | 7/2011 | Lanier | ................ | H04N 21/4751 345/2.2 |
| 2013/0311251 A1 * | 11/2013 | Gibson | .............. | G06Q 30/0251 705/14.4 |
| 2014/0161414 A1 * | 6/2014 | Gresham | .......... | H04N 21/41407 386/230 |
| 2015/0181314 A1 * | 6/2015 | Swanson | ................. | G01S 19/19 340/870.07 |
| 2016/0182594 A1 * | 6/2016 | White | ..................... | H04L 65/61 709/219 |
| 2017/0068511 A1 * | 3/2017 | Brown | ................ | G06F 3/04845 |
| 2017/0187771 A1 * | 6/2017 | Falcon | ................ | H04L 65/1083 |
| 2018/0181566 A1 * | 6/2018 | Lee | ..................... | H04N 21/4147 |
| 2018/0310050 A1 * | 10/2018 | Goldstein | ........ | H04N 21/43615 |
| 2019/0116173 A1 * | 4/2019 | Robison | ................ | H04W 12/06 |
| 2019/0208396 A1 * | 7/2019 | Thoen | ................... | H04W 48/10 |
| 2020/0174734 A1 * | 6/2020 | Gomes | .................... | H04R 1/10 |
| 2020/0194004 A1 * | 6/2020 | Bates | ...................... | G10L 17/00 |
| 2020/0413147 A1 * | 12/2020 | Gupta | .............. | H04N 21/43615 |
| 2021/0397407 A1 * | 12/2021 | Eubank | ................... | G06F 3/167 |
| 2021/0405961 A1 * | 12/2021 | Dong | ....................... | H04R 3/12 |

(Continued)

*Primary Examiner* — Oleg Survillo

(57) ABSTRACT

A method, a system, and a computer program product for managing multimedia streams of user devices. A reproduction of one or more multimedia streams on a first computing device is determined. A location of a second computing device being positioned in an area enclosed by one or more boundaries in a plurality of boundaries is detected. Each boundary in the plurality of boundaries is associated with a predetermined type of a multimedia stream in one or more multimedia streams. At least one of a pausing and an unpausing of the reproduction of one or more multimedia streams on the first computing device based on the detected location of the second computing device is executed.

11 Claims, 9 Drawing Sheets

(56) References Cited

U.S. PATENT DOCUMENTS

| | | | | |
|---|---|---|---|---|
| 2022/0131918 | A1* | 4/2022 | Schneider | H04L 65/613 |
| 2022/0141510 | A1* | 5/2022 | Krishnamoorthi | H04N 21/25825 |
| | | | | 709/231 |
| 2022/0224985 | A1* | 7/2022 | Zhang | H04N 21/454 |
| 2023/0062414 | A1* | 3/2023 | Desai | G08B 21/0461 |
| 2023/0087963 | A1* | 3/2023 | Doken | H04N 21/4532 |
| | | | | 725/12 |

* cited by examiner

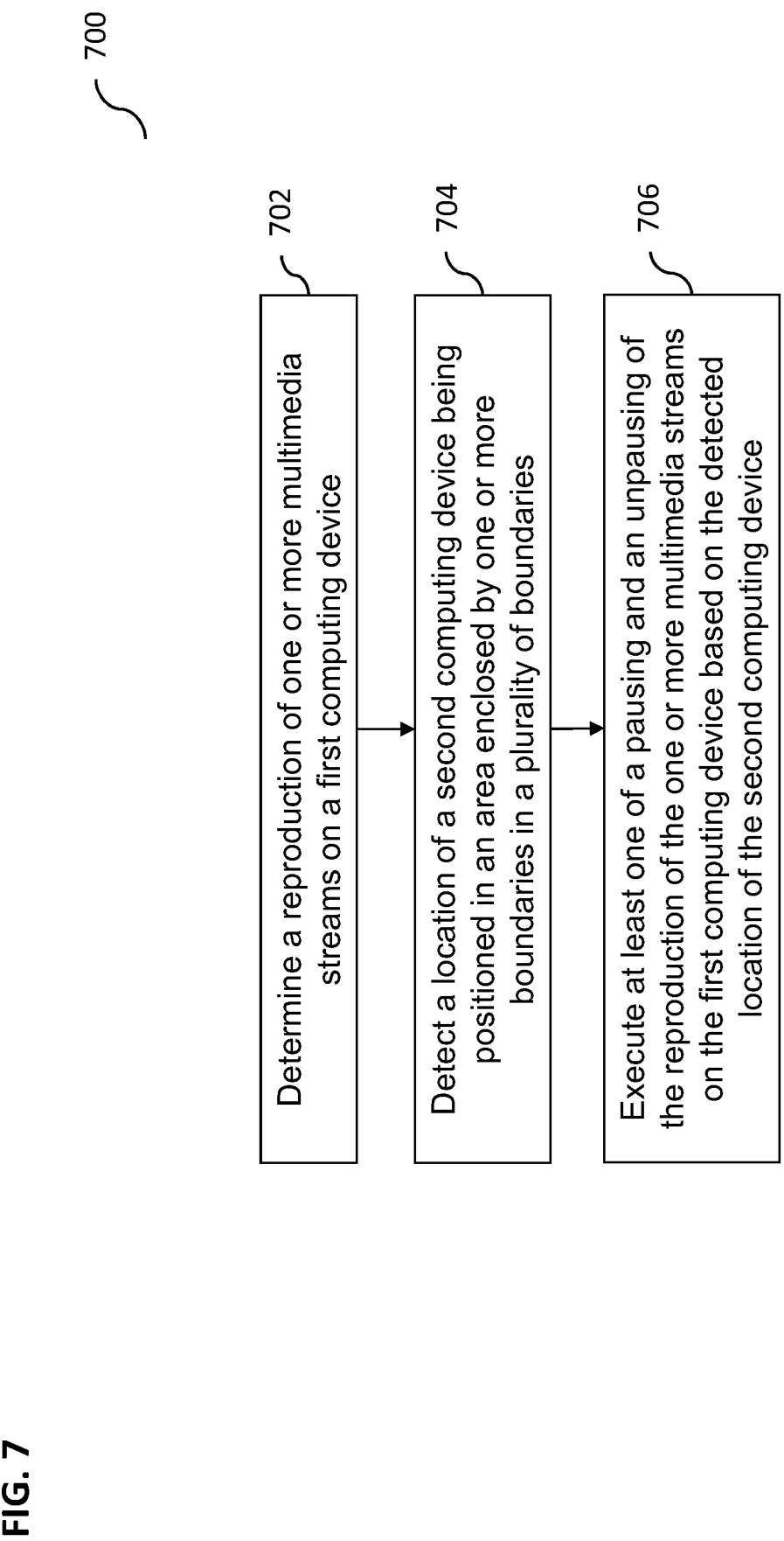

PROXIMITY AND CONTEXT BASED STREAM PLAYBACK CONTROL

BACKGROUND

In today's world, computers are capable of performing a multitude of tasks, such as, for example, productivity jobs, word processing, online conferencing, streaming of videos, listing to music, etc. Computer users can perform these tasks at home, in the office, and/or in any other locations. Periodically, users are interrupted during performance of the tasks and need to pause them (e.g., pause a video, audio, etc.) only to resume them a short time later. Sometimes tasks are not paused at all and receipt of valuable information by the users may be jeopardized. Thus, timely pausing and/or resuming of the tasks (e.g., streaming of audio, video, etc.) is/are important to users' productivity, receipt of valuable data/information, and for any other purposes.

SUMMARY

In some implementations, the current subject matter relates to a computer implemented method for managing multimedia streams of user devices. The method may include determining, using at least one processor, a reproduction of one or more multimedia streams on a first computing device, detecting a location of a second computing device being positioned in an area enclosed by one or more boundaries in a plurality of boundaries, where each boundary in the plurality of boundaries may be associated with a predetermined type of a multimedia stream in one or more multimedia streams, and executing at least one of a pausing and an unpausing of the reproduction of one or more multimedia streams on the first computing device based on the detected location of the second computing device.

In some implementations, the current subject matter can include one or more of the following optional features. The multimedia streams may include at least one of the following: an audio data stream, a video data stream, a graphical data stream, a text data stream, and any combination thereof.

In some implementations, the executing may include executing at least one of the pausing and the unpausing of the reproduction of a first multimedia stream based on detecting the second computing device being located in a first area enclosed by a first boundary. The executing may also include executing at least one of the pausing and the unpausing of the reproduction of a second multimedia stream based on detecting the second computing device being located in a second area enclosed by a second boundary. The second boundary being different from the first boundary. For example, the first area may be enclosed in the second area. Alternatively, or in addition to, the second area may be enclosed in the first area.

In some implementations, the executing of at least one of the pausing and the unpausing may be based on a proximity of the second computing device to the first computing device. The executing of at least one of the pausing and the unpausing may also be based on a context of one or more multimedia streams being reproduced by the first computing device.

In some implementations, the detecting may include detecting a signal strength generated by the second computing device, and determining, based on the detected signal strength, the location of the second computing device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 illustrates an example of a method, according to some implementations of the current subject matter.

DETAILED DESCRIPTION

Figure 1:
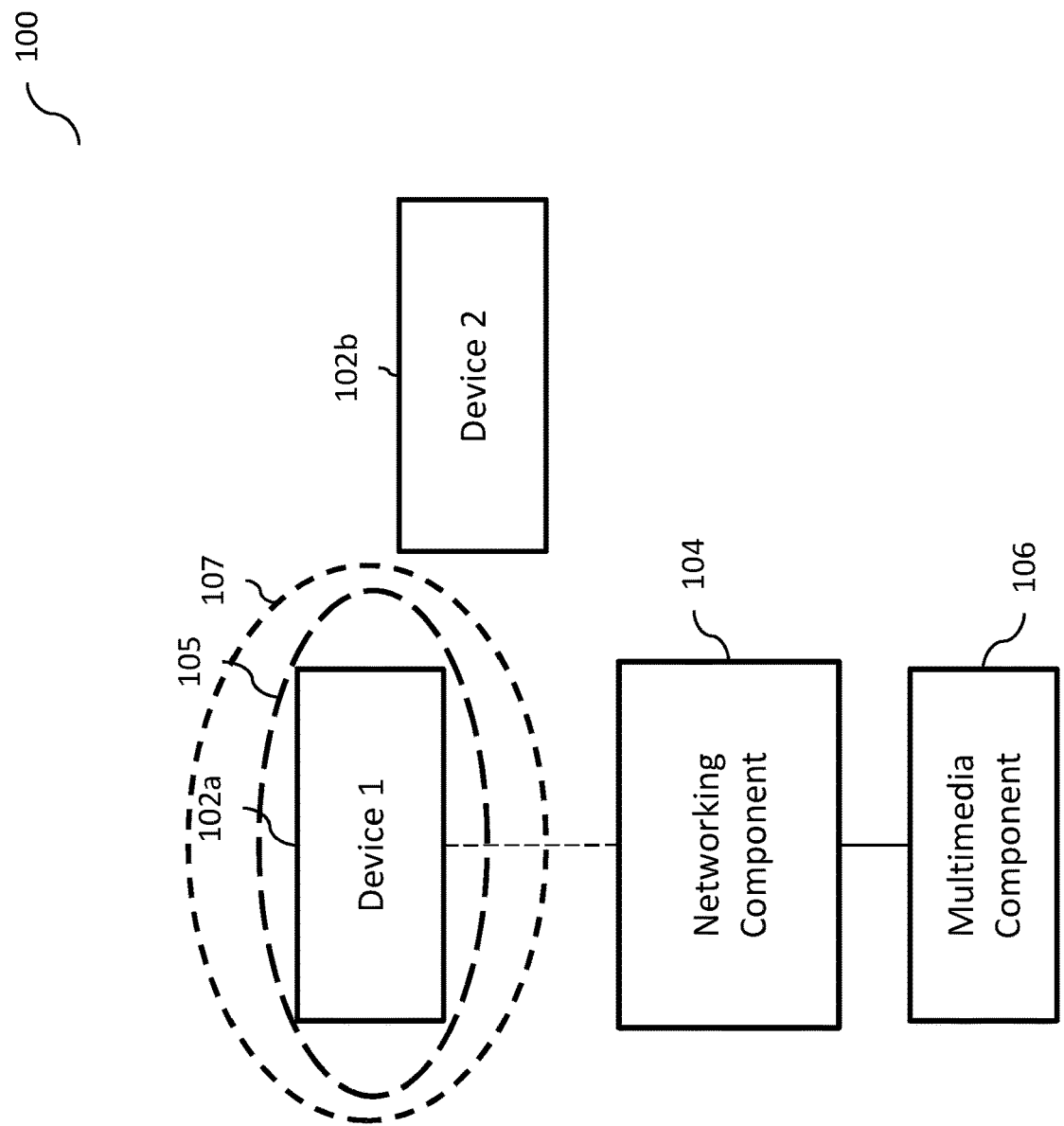
FIG. 1 illustrates an example of a system for managing of one or more multimedia streams to one or more user devices, according to some implementations of the current subject matter.

To address the deficiencies of currently available solutions, one or more implementations of the current subject matter provide for an ability to manage reproduction of multimedia stream on computing device(s).

In some implementations, the current subject matter may be configured to provide management of multimedia connections (e.g., video, audio, etc.) of one or more computing devices. The management of such connections may include a detection of one or more first times when to temporarily interrupt one or more types of connections (e.g., pause video, pause audio, etc.) and a determination of one or more second times when to resume the respective interrupted multimedia connections. Such management may be useful in one or more of the following exemplary use cases. In exemplary use case, a first user may be in a process of watching a video, listening to an audio, and/or otherwise accessing any other multimedia stream from user's computing device (e.g., a personal computer, a laptop, a smartphone, a tablet computer, etc.). A second user approaches the first user (e.g., a first user's colleague walks into the first user's office, desk area, etc.). To avoid loss of receipt of valuable information from the video, audio, multimedia, etc., the first user would need to manually pause the multimedia stream and then manually resume it once the second user leaves. Another exemplary use case may involve the first user being required to step away from the user's computing device (e.g., in case of remote work, the first user may be called away by user's spouse, partner, child(ren), etc.), which will require the user to manually pause the multimedia stream and manually result the stream upon return to the user's computing device. Yet another exemplary use case may involve online conference meetings, during which some users may prefer to move around their computing device while listening to an audio stream (for video calls the users typically have to be near the device in order to view the video stream). This means that for any audio streams, any auto-pausing of such stream based on user movement may become intrusive for other users (whether physically present near the user and/or those in the online meeting). For example, the current subject matter may be configured to determine whether devices belong to one user and/or another user. For example, if one device becomes proximate to another device (whether or not of the same or different user), that device may transmit various information to the other device (e.g., via Bluetooth™, broadcast, handshake, and/or any other protocol and/or other way) identifying the first device. Alternatively, or in addition, one or both devices may be transmitting and/or broadcasting their information, which, in turn, may be detected by other devices. As can be understood, there may be many other use cases where it may be helpful to perform pausing/resuming of multimedia streams, which may be addressed by the current subject matter's ability to manage multimedia connections to user's computing devices in various contexts.

In some implementations, the current subject matter may be configured to manage one or more multimedia connections to one or more user devices based on specific context, proximity of other user devices with respect to user devices streaming the multiday connections for the user, user preferences, and/or other facts. For example, as discussed above, the specific context may involve another user entering and/or leaving in user's location (e.g., office, desk, etc.) to determine a need to execute auto-pause and/or auto-resume one or more multimedia streams, respectively. Proximity factor may be used on locations of one or more user devices in relation to user devices executing multimedia streams. For example, user's computing device streaming audio/video/etc. ("streaming computing device") may detect presence of user's mobile device (e.g., smartphone, tablet computer, etc.) and determine a distance of the user to the streaming computing device. Based on the determined distance, the streaming computing device may determine that the user is leaving and/or returning to the location of the streaming computing device (e.g., user's desk) and execute an auto-pause and/or auto-resume of the audio/video/etc. stream without any user intervention and/or other manual operations. Further, the user may set one or more user preferences to define when to execute an auto-pause and/or auto-resume of different types of multimedia streams (e.g., audio, video, etc.). For instance, the user may configure the streaming computing device to execute an auto-pause and/or auto-resume for a video stream when the user is close (e.g., based on the above determined distance) to streaming computing device. Alternatively, or in addition to, the user may configure the streaming computing device NOT to execute an auto-pause and/or auto-resume for an audio stream when the user (e.g., based on the above determined distance) is in close proximity (e.g., within 1 meter (and/or any other desired distance) of the streaming computing device) but to execute an auto-pause/resume when the user is farther away (e.g., greater than 1 meter).

FIG. 1 illustrates an example of a system 100 for managing one or more multimedia connections to one or more user devices, according to some implementations of the current subject matter. The devices may be configured to transmit and/or receive various information, data, files, signals, etc., which may include at least one of the following: a video, an audio, an image, a graphics data, a text data, and/or any other information, data, file, signal that may or may not include a video, an audio, an image, a graphics data, a text data, and/or any other data file ("data file").

The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

Referring back to FIG. 1, the system 100 may be configured to include one or more user devices 102 (i.e., device 1 102a, device 2 102b), one or more optional networking components 104, and one or more multimedia component(s) 106. The multimedia component 106 may be configured to transmit one or more multimedia streams (e.g., audio, video, etc.) to one or more devices 102 via one or more communications networks (e.g., wireless, wired, etc.), such as using networking component(s) 104. Alternatively, or in addition to, one or more files representing one or more multimedia streams may be locally stored on the devices 102 and may be locally streamed (e.g., presented on a user interface, via audio equipment, etc. of and/or connected to devices 102). The devices 102 may be equipped with video, audio, file sharing, user interface (e.g., screen) sharing, etc. hardware and/or software capabilities as well as any other computing and/or processing capabilities. One or more of the devices 102 may include a single or multiple computing devices and may be configured to be used by a single user and/or multiple different users.

In some implementations, the device 102a may be configured to receive one or more multimedia data streams and present such streams on the device 102a using one or more of its multimedia components, e.g., a display, one or more audio speakers, etc. Alternatively or in addition to, the files representing multimedia streams may be locally stored on the device 102a and be reproduced through device 102a's multimedia components. The multimedia streams may include different types of multimedia, e.g., audio streams, video streams, etc., which may be reproduced as a combined multimedia stream, as separate streams, and/or in any other fashion.

The device 102a may also be configured to detect proximity of the user to the device 102a, where the user may be using the device 102a and/or any another device, such as, device 2 102b. User proximity may be detected within one or more boundaries 105, 107, which may, for instance, correspond to geo-fences surrounding device 102a. Each such boundary 105, 107 may be associated a particular type of multimedia stream. For example, boundary 105 may correspond to a video stream range and boundary 107 may correspond to an audio stream range. As can be understood, other types of multimedia streams may correspond to their own boundaries. Boundaries may be defined by a predetermined distance (e.g., circumferential, elliptical, etc.) from the device 102a. The boundaries 105, 107 may be the same and/or different and may depend on specific devices 102, user preferences, types of multimedia streams, and/or any other factors.

In some implementations, the system 100 may be configured to detect whether the user of the device 102a is entering and/or leaving one or more boundaries 105, 107. Alternatively, or in addition, the system 100 may be configured to detect whether another device 102b is entering and/or leaving one or more boundaries 105, 107. Based on such detection, the system 100 may be configured to pause and/or resume a particular multimedia stream. For example, upon the user of device 102a entering the boundary 107, the system 100 may be configured to resume an audio stream, which may have been previously paused by the device 102a when the system 100 detected the user of device 102 leaving the boundary 107. By way of another example, the system 100 may be configured to pause a video stream being reproduced by the device 102a upon detecting that a device 102b (e.g., carried by another user) has entered boundary 105. The system 100 may resume the video stream upon detecting that the device 102b has exited the boundary 105. Detection of entry into and/or presence of devices in a particular boundary can be accomplished using any existing technologies (e.g., near-field communications, Bluetooth™, wireless signals, etc.). The pausing/resumption of multimedia streams may be performed automatically based on the detection, in accordance with particular preferences (e.g., that may be set by the user, system 100, various policies, etc.), and/or based on any other factors/parameters.

Moreover, in some example implementations, the system 100 may be configured to use a contextual awareness processes to determine whether the user is not actively viewing, listening, etc. a particular data stream that may be delivered to the user's device. For example, the system 100 may be configured to determine that the user is currently performing various tasks (e.g., by detecting that the user stepped away, another user entered one or more boundaries, etc.) that may be unrelated to the multimedia stream. The system 100 may then pause the audio, video, etc. data stream that is being reproduced on the user's device and resume it when the user has returned (and/or another user has exited one or more boundaries).

Figure 2A:
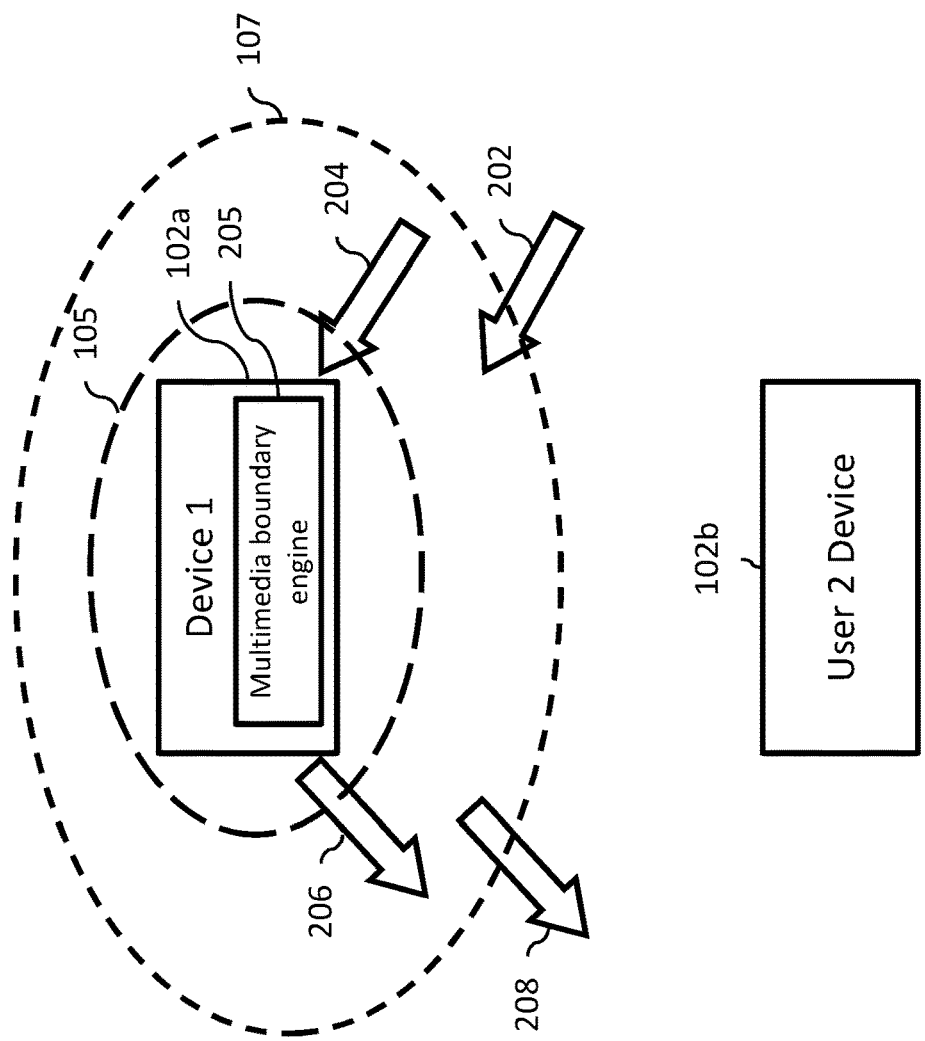
FIG. 2a illustrates an exemplary system for management of multimedia streams reproduced by user devices, according to some implementations of the current subject matter.
Figure 2B:
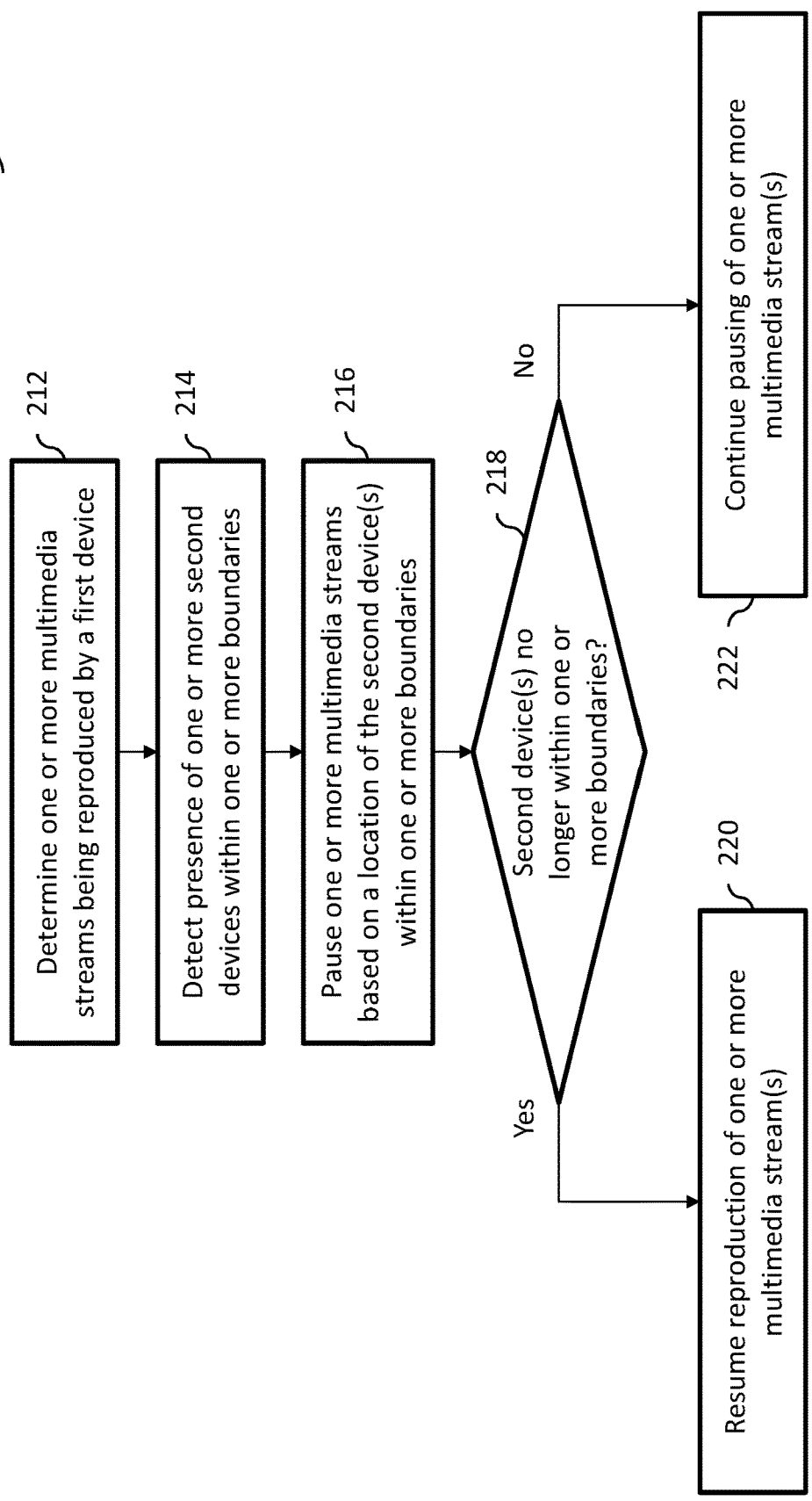
FIG. 2b illustrates a method for managing multimedia streams reproduced by the user device shown in FIG. 2a, according to some implementations of the current subject matter.

FIGS. 2a-b illustrate an exemplary management of multimedia streams reproduced by user devices, according to some implementations of the current subject matter. FIG. 2a illustrates a system 200 that may be similar to system 100 shown in FIG. 1 and may be used to manage multimedia streams reproduced by user device 102a when another user device 102b enters/exits one of the boundaries 105, 107 around the device 102a.

The system 200 may be configured to determine that the user device 102a is reproducing one or more multimedia streams, e.g., audio, video, etc. Each type of multimedia streams may be associated with a particular boundary or geo-fence surrounding the user device 102a. As shown in FIG. 2a, the device 102a may be configured to include the boundary 105 associated with a first type of multimedia stream (e.g., a video stream) and the boundary 107 associated with a second type of multimedia stream (e.g., an audio stream). Other boundaries may be associated with other types of multimedia streams. The boundaries may be based on various preferences, e.g., a user of device 102a defining a particular geo-fence, a signal strength of the device 102a and/or device 102b that may be detected by device 102a, sensitivity of content of the multimedia stream that is being reproduced by device 102a, and/or any other factors.

In some implementations, the user device 102a may be configured to include a multimedia boundary engine 205 that may be configured to determine that one or more multimedia streams are being reproduced by the device 102a. The engine 205 may be any type of computing agent, component, etc. (including any combination of hardware, software, etc.) that may be used to determine reproduction of multimedia streams by device 102a.

The engine 205 may monitor and/or detect that another device—user device 102b—may have entered, at 202, one or more areas enclosed by one or more boundaries, e.g., boundary 107 that may be associated with an audio stream of the multimedia stream. The detection may be based on, as stated above, for example, a signal strength of device 102b detected by the engine 205 (and/or any other component of device 102b), a video detection, an audio detection, an alarm tripping, etc. Alternatively, or in addition to, signal strengths of either of devices 102a, 102b may be used to determine whether one or both devices and/or engine 205 may need to take appropriate action. Once the engine 205 has detected presence of the device 102b in an area within boundary 107, the engine 205 may be configured to cause pausing of reproduction of the audio stream by the device 102a. It may also cause pausing of other types of multimedia streams. Alternatively, or in addition to, other types of multimedia streams may continue to be reproduced by the device 102a. The pausing may be automatic and/or based on a user response to a prompt that may be generated by the engine 205 and displayed on a user interface of the device 102a. One or more preferences associated with pausing may define execution of the pause.

Upon device 102*b* crossing another boundary, e.g., boundary 105, at 204, and entering an area enclosed by that area, the engine 205 may be configured to pause reproduction of the video stream by the device 102*a*. The engine 205 may also continue pausing of the audio stream. Alternatively, or in addition to, the engine 205 may resume reproduction of the audio stream. Again, pausing/unpausing may be automatic and/or based on a user response to another prompt that may be generated by the engine 205 and displayed on the user interface of the device 102*a*. One or more preferences associated with pausing of the video stream may define execution of the pausing and/or unpausing of various types of multimedia streams.

The engine 205 may be configured to unpause the video stream upon detecting the device 102*b* exiting, at 206, the area enclosed by the boundary 105. The engine 205 may un-pause the video stream upon detecting that a signal strength of the device 102*b* is decreasing, and/or using video detection, audio detection, alarm tripping, etc. Unpausing may be automatic and/or based on a user response to yet another prompt that may be generated by the engine 205 and displayed on the user interface of the device 102*a*. One or more preferences associated with unpausing of the multimedia streams may define execution of the unpausing. Further, upon detecting that the device 102*b* exited, at 208, the area enclosed by the boundary 107, the engine 205 may also unpause the audio stream.

FIG. 2*b* illustrates a corresponding method 210 for managing multimedia streams reproduced by user device 102*a*, according to some implementations of the current subject matter. The method 210 may be performed by the system 200 shown in FIG. 2*a*, and in particular engine 205. At 212, the engine 205 may determine that one or more multimedia streams are being reproduced by the device 102*a*. The multimedia streams may be reproduced from one or more files that may be locally stored in one or more memory locations of the device 102*a* and/or streamed from the multimedia component 106 (via the network component 104). The multimedia streams may include an audio stream, a video stream, and/or any other type of multimedia streams.

At 214, the engine 205 may detect presences of one or more devices (e.g., user device(s) 102*b*) within one or more boundaries surrounding the device 102*a* (e.g., boundaries 105, 107). As stated above, each boundary may be associated with a particular type of multimedia stream, e.g., boundary 205 may be associated with a video stream and boundary 107 may be associated with an audio stream.

At 216, the engine 205 may pause one or more multimedia streams being reproduced on the device 102*a*. The pausing of specific types of multimedia streams (e.g., video, audio) may be based on a location of the device 102*b* with respect to one or more boundaries 105, 107, as discussed above.

At 218, the engine 205 may check whether the device 102*b* is still within one or more areas enclosed by one or more boundaries. The checking may be periodic, constant, and/or based on any other pre-defined intervals. As part of the checking, the engine 205 may assess a signal strength that may be produced by the device 102*b*. Upon the signal strength falling below a predetermined threshold that may be associated with an area enclosed by a particular boundary, the engine 205 may determine that device 102*b* is no longer located within that boundary. If the device 102*b* is no longer within an area enclosed by a particular boundary, the engine may unpause or resume reproduction of a specific multimedia stream associated with a boundary within which the device 102*b* is no longer located, at 220. Otherwise, at 222, the specific multimedia streams may continue to be paused (e.g., if the device 102*b* is still located within an area enclosed by the boundary 105, both video and audio streams may be continue to be paused; if the device 102*b* is located outside of the boundary 105 but within the boundary 107, the video stream may be unpaused, but the audio stream may remain paused; if the device 102*b* is located outside of the boundaries 105 and 107, reproduction of both video and audio streams may resume).

Figure 3A:
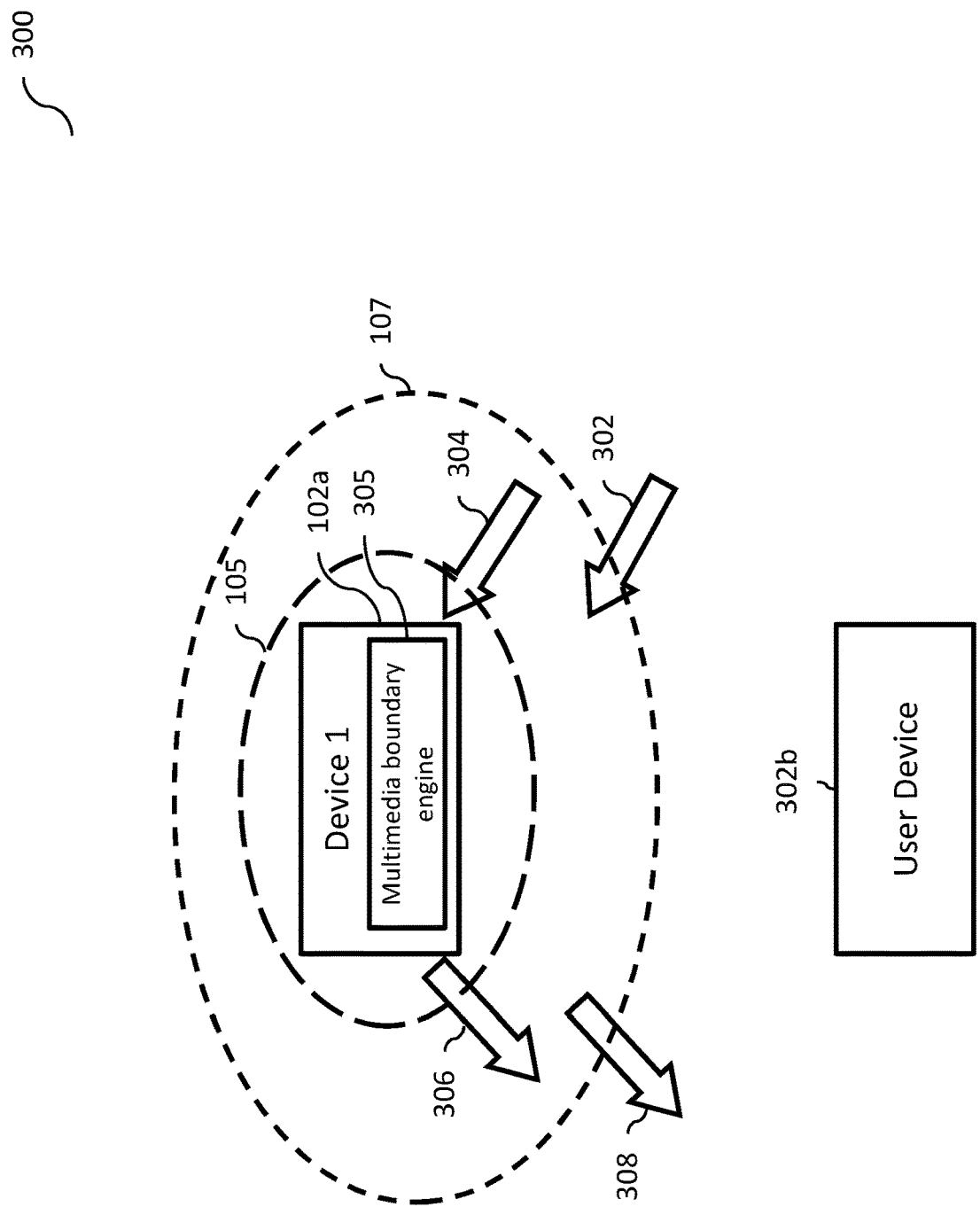
FIG. 3a illustrates another exemplary system for management of multimedia streams reproduced by user devices, according to some implementations of the current subject matter.
Figure 3B:
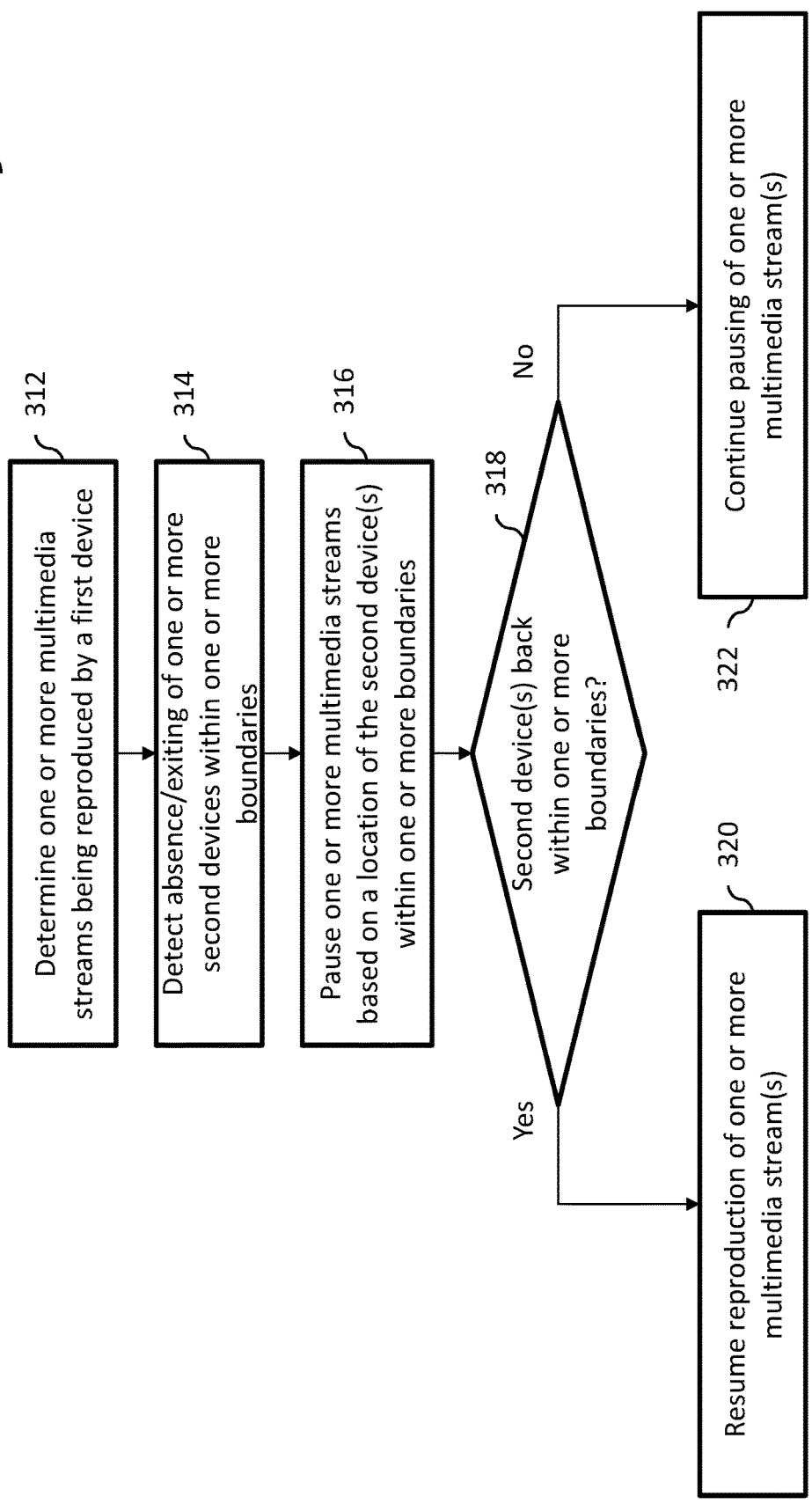
FIG. 3b illustrates a method for managing multimedia streams reproduced by the user device shown in FIG. 3a, according to some implementations of the current subject matter.

FIGS. 3*a*-*b* illustrate an exemplary management of multimedia streams reproduced by user devices, according to some implementations of the current subject matter. FIG. 3*a* illustrates a system 300 that may be similar to system 100 shown in FIG. 1 and/or system 200 shown in FIG. 2*a* and may be used to manage multimedia streams reproduced by user device 102*a* when the user of the device 102*a* enters/exits areas enclosed by one of the boundaries 105, 107 around the device 102*a*.

Similar to system 200, the system 300 may be configured to determine that the user device 102*a* is reproducing one or more multimedia streams, e.g., audio, video, etc. Each type of multimedia streams may be associated with a particular boundary or geo-fence surrounding the user device 102*a*. As shown in FIG. 3*a*, the device 102*a* may be configured to be associated with the boundary 105 associated with a first type of multimedia stream (e.g., a video stream) and the boundary 107 associated with a second type of multimedia stream (e.g., an audio stream), and/or any other boundaries that may be associated with other types of multimedia streams. The boundaries may be based on various preferences, e.g., a user of device 102*a* defining a particular geo-fence, a signal strength of the device 102*a* and/or any other devices 302*b* (e.g., user's mobile telephone, a smartphone, a tablet computer, a Bluetooth™ enabled device, a near-field communications enabled device, and/or any other device) that may be used by the same user that uses device 102*a* and that may be detected by device 102*a*, sensitivity of content of the multimedia stream that is being reproduced by device 102*a*, and/or any other factors.

In some implementations, the user device 102*a* may be configured to include a multimedia boundary engine 305 that may be similar to the engine 205 shown in FIG. 2*a*. The engine 305 may be configured to determine that one or more multimedia streams are being reproduced by the device 102*a* (e.g., a video playing on a screen of the device 102*a*). The engine 305 may be any type of computing agent, component, etc. (including any combination of hardware, software, etc.) that may be used to determine reproduction of multimedia streams by device 102*a*.

The engine 305 may monitor and/or detect that the user of the device 102*a* may have entered, at 302 and/or at 304, and/or exited at 306 and/or at 308, one or more areas enclosed by boundaries associated with a particular type of multimedia stream. The detection may be based on, for example, a signal strength of the user device 302*b* detected by the engine 305, a video detection, an audio detection, an alarm tripping, etc. Once the engine 305 has detected that the user has exited (e.g., user's device 302*b* is no longer present) an area enclosed by the boundary 105, at 306, the engine 305 may be configured to pause reproduction of the video stream by the device 102*a*. Similarly, the engine 305 may pause reproduction of the audio stream by the device 102*a* upon detecting that the user (e.g., user device 302*b*) is no longer located within an area enclosed by the boundary 107, at 308. It may also cause pausing of other types of multimedia streams. Alternatively, or in addition to, other types of multimedia streams may continue to be reproduced by the device 102*a*. The pausing may be automatic and/or based on a user response to a prompt that may be generated by the engine 305 and displayed on a user interface of the device 102*a*. One or more preferences associated with pausing may define execution of the pause.

Upon the user crossing and entering an area enclosed by boundary 107, at 302, the engine 305 may be configured to detect that the user has returned (e.g., based on a location of user device 302*b*, etc.) and resume reproduction of the audio stream by the device 102*a*. The engine 305 may continue pausing of the video stream. Alternatively, or in addition to, the engine 305 may resume reproduction of the video stream. The pausing and/or unpausing of various multimedia streams may be automatic and/or based on a user response to another prompt that may be generated by the engine 305 and displayed on the user interface of the device 102*a*. One or more preferences associated with pausing of the video stream may define execution of the pausing and/or unpausing of various types of multimedia streams.

The engine 305 may be configured to unpause the video stream upon detecting that the user entered an area enclosed by the boundary 105 (e.g., based on a location of user device 302*b* and/or any other device), at 304. The engine 305 may un-pause the video stream upon detecting that a signal strength of the user device 302*b* is increasing, and/or using video detection, audio detection, alarm tripping, etc. Unpausing may be automatic and/or based on a user response to yet another prompt that may be generated by the engine 305 and displayed on the user interface of the device 102*a*. One or more preferences associated with unpausing of the multimedia streams may define execution of the unpausing.

FIG. 3*b* illustrates a corresponding method 310 for managing multimedia streams reproduced by user device 102*a*, according to some implementations of the current subject matter. The method 310 may be performed by the system 300 shown in FIG. 3*a*, and in particular engine 305.

At 312, the engine 305 may determine that one or more multimedia streams are being reproduced by the device 102*a*. The multimedia streams may be reproduced from one or more files that may be locally stored in one or more memory locations of the device 102*a* and/or streamed from the multimedia component 106 (via the network component 104). The multimedia streams may include an audio stream, a video stream, and/or any other type of multimedia streams.

At 314, the engine 305 may detect absence and/or exiting of one or more devices (e.g., user device(s) 302*b*) area(s) enclosed by one or more boundaries surrounding the device 102*a* (e.g., boundaries 105, 107). As stated above, each boundary may be associated with a particular type of multimedia stream, e.g., boundary 305 may be associated with a video stream and boundary 107 may be associated with an audio stream.

At 316, the engine 305 may pause one or more multimedia streams being reproduced on the device 102*a*. The pausing of specific types of multimedia streams (e.g., video, audio) may be based on a location of the device 302*b* with respect to one or more boundaries 105, 107, as discussed above.

At 318, the engine 305 may check whether the device 302*b* has returned to one or more areas enclosed by one or more boundaries (e.g., crossed one or more boundaries 105, 107). The checking may be periodic, constant, and/or based on any other pre-defined intervals. As part of the checking, for example, the engine 305 may determine a signal strength that may be produced by the device 302*b*. Upon the signal strength exceeding a predetermined threshold that may be associated with an area enclosed by a particular boundary, the engine 305 may determine that device 302*b* has returned to an area enclosed by that boundary. If the device 302*b* is now located in the area enclosed by a particular boundary, the engine 305 may unpause or resume reproduction of a specific multimedia stream associated with a boundary within which the device 302*b* is longer located, at 320. Otherwise, at 322, the specific multimedia streams may continue to be paused.

Figure 4:
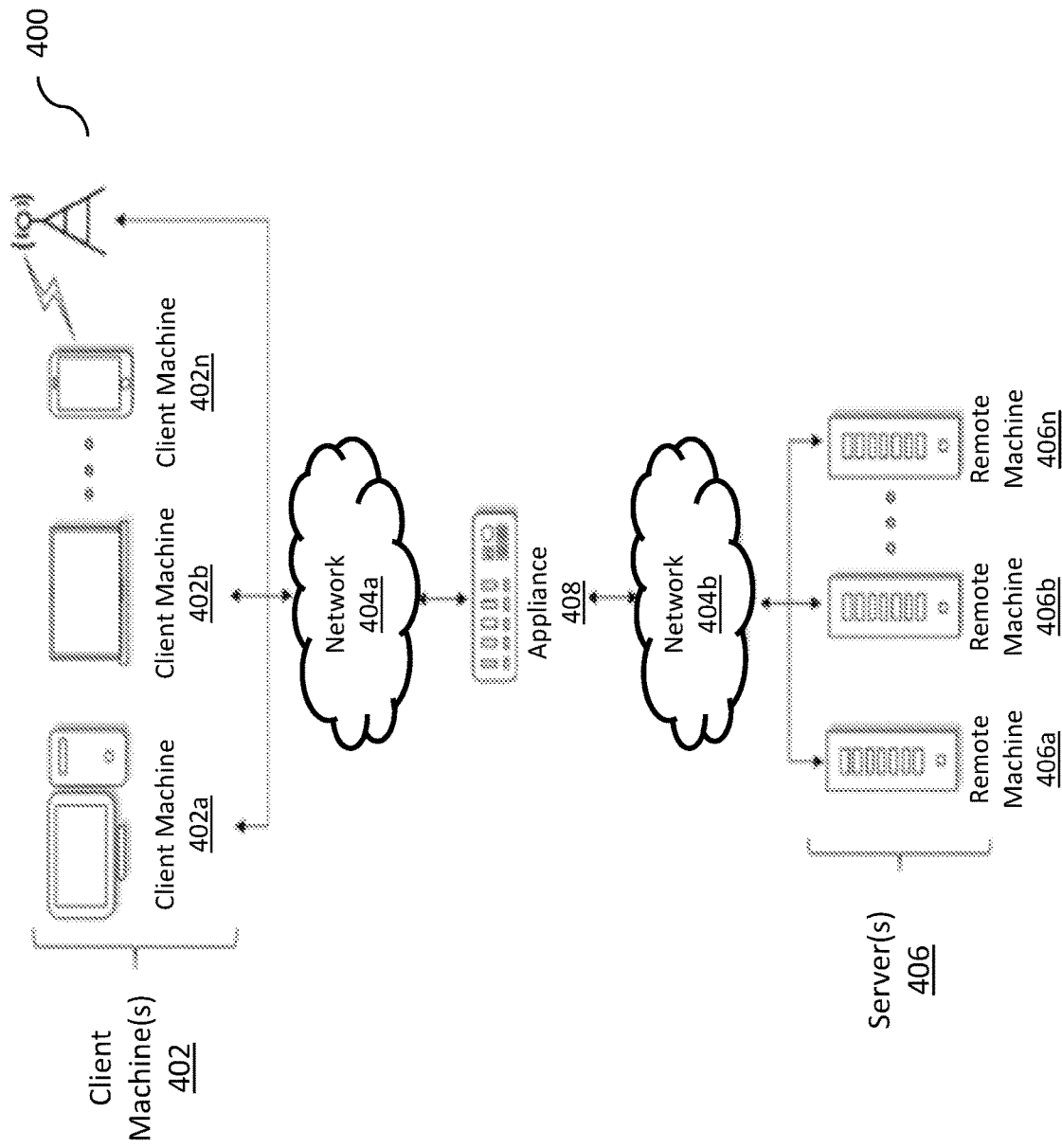
FIG. 4 illustrates an example of a network environment, according to some implementations of the current subject matter.

FIG. 4 illustrates an example of a network environment 400, according to some implementations of the current subject matter. Referring to FIGS. 1-3*b*, the network environment 400, in which various aspects of the disclosure may be implemented, may include one or more clients 402*a*-404*n*, one or more remote machines 406*a*-406*n*, one or more networks 404*a* and 404*b*, and one or more appliances 408 installed within the network environment 400. The clients 402*a*-402*n* communicate with the remote machines 406*a*-406*n* via the networks 404*a* and 404*b*.

In some example implementations, the clients 402*a*-402*n* may communicate with the remote machines 406*a*-406*n* via an appliance 408. The illustrated appliance 408 is positioned between the networks 404*a* and 404*b*, and may also be referred to as a network interface or gateway. In some example implementations, the appliance 408 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example implementations, multiple appliances 408 may be used, and the appliance(s) 408 may be deployed as part of the network 404*a* and/or 404*b*.

The clients 402*a*-402*n* may be generally referred to as client machines, local machines, clients, client nodes, client computers, client devices, computing devices, endpoints, or endpoint nodes. One or more of the clients 402*a*-402*n* may implement, for example, the client device 102 and/or the like. The remote machines 406*a*-406*n* may be generally referred to as servers or a server farm. In some example implementations, a client 402 may have the capacity to function as both a client node seeking access to resources provided by a server 406 and as a server 406 providing access to hosted resources for other clients 402*a*-402*n*. The networks 404*a* and 404*b* may be generally referred to as a network 404. The network 404 including the networks 404*a* and 404*b* may be configured in any combination of wired and wireless networks.

The servers 406 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 406 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-timedata communications; a hypertext transfer protocol (HTTP) client; a file transfer protocol (FTP) client; an Oscar client; a Telnet client; or any other set of executable instructions.

In some example implementations, a server 406 may execute a remote presentation services program or other program that uses a thin-client or a remote-display protocol to capture display output generated by an application executing on a server 406 and transmit the application display output to a client 402.

In yet other example implementations, a server 406 may execute a virtual machine, such as the first virtual machine and/or the second virtual machine, to provide, for example, to the user at a client device, access to a computing environment such as the virtual desktop. The virtual machine may be managed by, for example, a hypervisor (e.g., a first hypervisor, a second hypervisor, and/or the like), a virtual machine manager (VMM), or any other hardware virtualization technique within the server 406.

In some example implementations, the network 404 may be a local-area network (LAN), a metropolitan area network (MAN), a wide area network (WAN), a primary public network, and/or a primary private network. Additional implementations may include one or more mobile telephone networks that use various protocols to communicate among mobile devices. For short-range communications within a wireless local-area network (WLAN), the protocols may include 1002.11, Bluetooth, and Near Field Communication (NFC).

Figure 5:
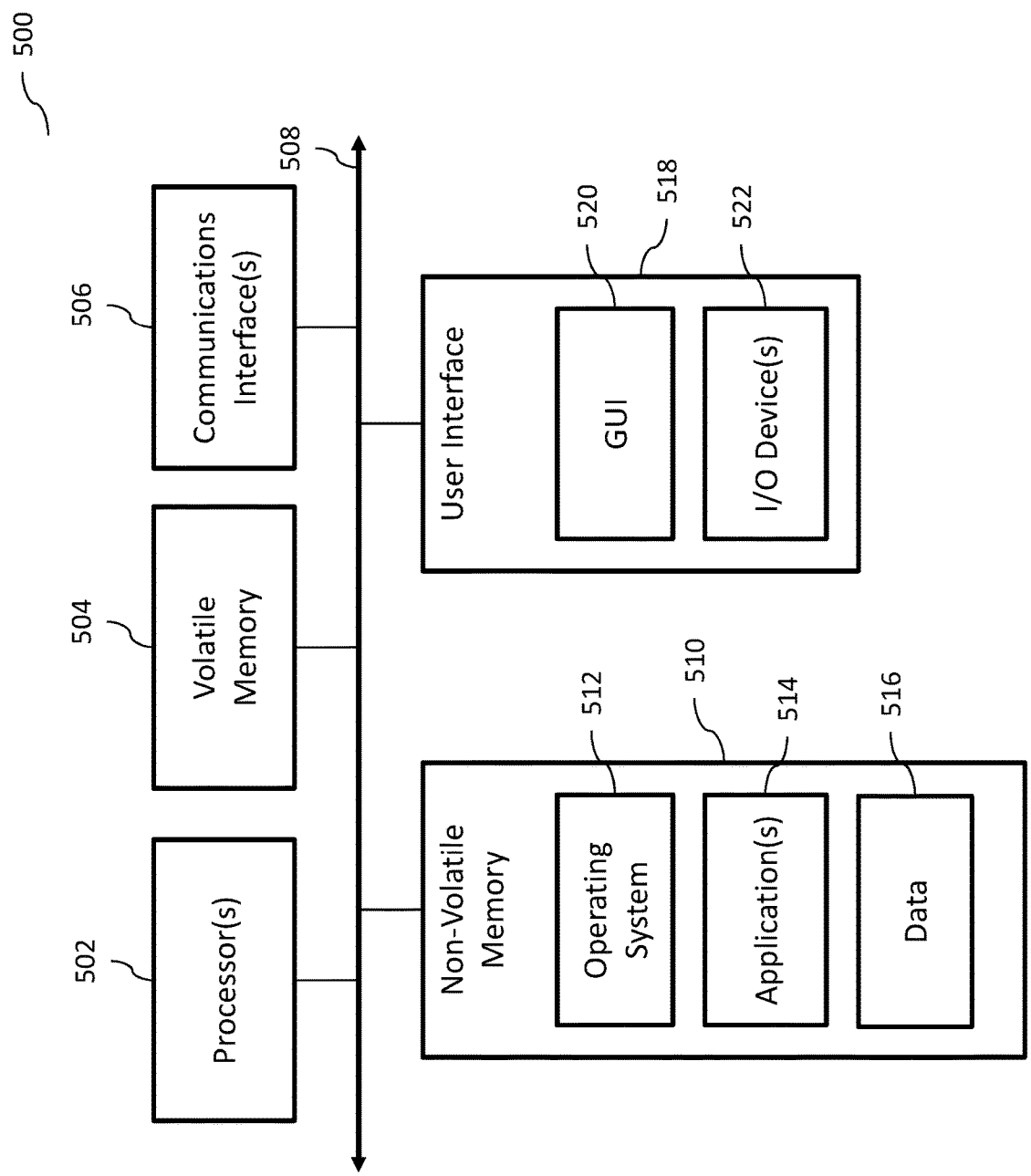
FIG. 5 depicts a block diagram illustrating an example of a computing device, according to some implementations of the current subject matter.

FIG. 5 depicts a block diagram illustrating an example of a computing device 500, in accordance with some example implementations. Referring to FIGS. 1-4, the computing device 500 may be useful for practicing an implementation of the system 100.

As shown in FIG. 5, the computing device 500 may include one or more processors 502, volatile memory 504 (e.g., RAM), non-volatile memory 510 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 518, one or more communications interfaces 506, and a communication bus 508. The user interface 518 may include a graphical user interface (GUI) 520 (e.g., a touchscreen, a display, and/or the like) and one or more input/output (I/O) devices 522 (e.g., a mouse, a keyboard, and/or the like). The non-volatile memory 510 may store an operating system 512, one or more applications 514, and data 516 such that computer instructions of the operating system 512 and/or applications 514 are executed by the processor(s) 502 out of the volatile memory 504. Data may be entered using an input device of the GUI 520 or received from I/O device(s) 522. Various elements of the computing device 500 may communicate via communication the communication bus 508. The computing device 500 as shown in FIG. 5 is shown merely as an example, and may be implemented by any computing or processing environment and with any type of machine or set of machines that may have suitable hardware and/or software capable of operating as described herein.

The processor(s) 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example implementations, the "processor" may be one or more physical processors or one or more "virtual" (e.g., remotely located or "cloud") processors.

The communications interfaces 506 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example implementations, one or more computing devices 500 may execute an application on behalf of a user of a client computing device (e.g., clients 402), may execute a virtual machine, which provides an execution session within which applications execute on behalf of a user or a client computing device (e.g., clients 402), such as a hosted desktop session (e.g., a virtual desktop), may execute a terminal services session to provide a hosted desktop environment, or may provide access to a computing environment including one or more of: one or more applications, one or more desktop applications, and one or more desktop sessions in which one or more applications may execute.

Figure 6:
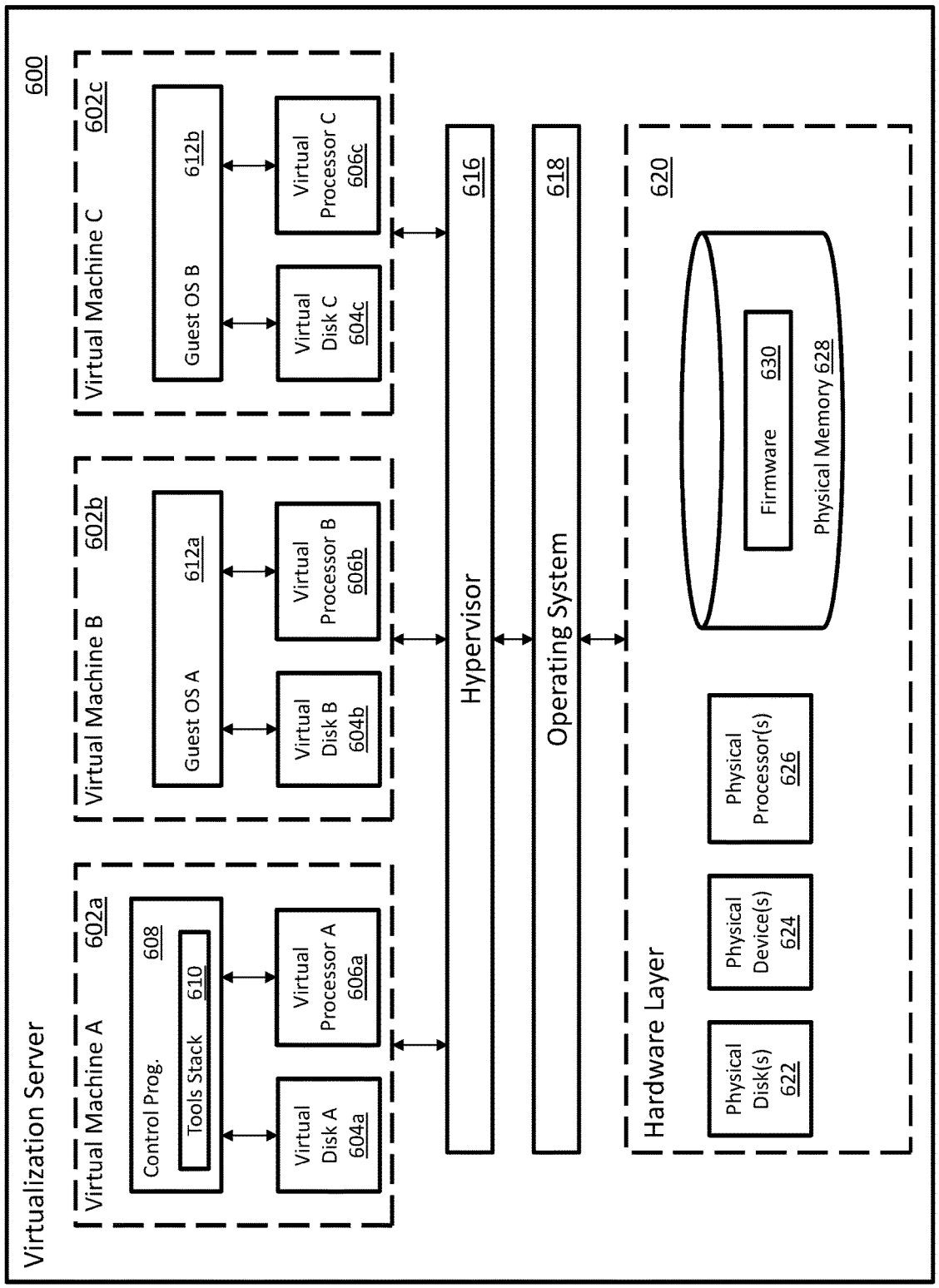
FIG. 6 illustrates a high-level architecture of an example of a virtualization system for implementing the computing system shown in FIG. 1, according to some implementations of the current subject matter.

FIG. 6 illustrates a high-level architecture of an example of a virtualization system for implementing the computing system 100, in accordance with some example implementations. As shown in FIG. 6, the virtualization system may be a single-server or multi-server system, or a cloud system, including at least one virtualization server 600 configured to provide virtual desktops and/or virtual applications to one or more client access devices 402*a-c*. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 600 may be configured as a virtualization server in a virtualization environment, for example, a single-server, multi-server, or cloud computing environment. Virtualization server 600 illustrated in FIG. 6 may be deployed as and/or implemented by one or more implementations of server 406 illustrated in FIG. 4 or by other known computing devices. Included in virtualization server 600 is hardware layer 620 that may include one or more physical disks 622, one or more physical devices 624, one or more physical processors 626, and one or more physical memories 628. In some implementations, firmware 630 may be stored within a memory element in physical memory 628 and be executed by one or more of physical processors 626. Virtualization server 600 may further include operating system 618 that may be stored in a memory element in physical memory 628 and executed by one or more of physical processors 626. Still further, hypervisor 616 may be stored in a memory element in physical memory 628 and be executed by one or more of physical processors 626. Presence of operating system 618 may be optional.

Executing on one or more of physical processors 626 may be one or more virtual machines 602A-C (generally, 602). Each virtual machine 602 may have virtual disk 604A-C and virtual processor 606A-C. In some implementations, first virtual machine 602A may execute, using virtual processor 606A, control program 608 that includes tools stack 610. Control program 608 may be referred to as a control virtual machine, Domain 0, Dom0, or other virtual machine used for system administration and/or control. In some implementations, one or more virtual machines 602B-C may execute, using virtual processor 606B-C, guest operating system 612A-B (generally, 612).

Physical devices 624 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 600. Physical memory 628 in hardware layer 620 may include any type of memory. Physical memory 628 may store data, and in some implementations may store one or more programs, or set of executable instructions. FIG. 6 illustrates an implementation where firmware 630 is stored within physical memory 628 of virtualization server 600. Programs or executable instructions stored in physical memory 628 may be executed by the one or more processors 626 of virtualization server 600.

Virtualization server 600 may also include hypervisor 616. In some implementations, hypervisor 616 may be a program executed by processors 626 on virtualization server 600 to create and manage any number of virtual machines 602. Hypervisor 616 may be referred to as a virtual machine monitor, or platform virtualization software. In some implementations, hypervisor 616 may be any combination of executable instructions and hardware that monitors virtual machines 602 executing on a computing machine. Hypervisor 616 may be a Type 2 hypervisor, where the hypervisor executes within operating system 618 executing on virtualization server 600. Virtual machines may then execute at a layer above hypervisor 616. In some implementations, the Type 2 hypervisor may execute within the context of a user's operating system such that the Type 2 hypervisor interacts with the user's operating system. In other implementations, one or more virtualization servers 600 in a virtualization environment may instead include a Type 1 hypervisor (not shown). A Type 1 hypervisor may execute on virtualization server 600 by directly accessing the hardware and resources within hardware layer 620. That is, while Type 2 hypervisor 616 accesses system resources through host operating system 618, as shown, a Type 1 hypervisor may directly access all system resources without host operating system 618. A Type 1 hypervisor may execute directly on one or more physical processors 626 of virtualization server 600, and may include program data stored in physical memory 628.

Hypervisor 616, in some implementations, may provide virtual resources to guest operating systems 612 or control programs 608 executing on virtual machines 602 in any manner that simulates operating systems 612 or control programs 608 having direct access to system resources. System resources can include, but are not limited to, physical devices 624, physical disks 622, physical processors 626, physical memory 628, and any other component included in hardware layer 620 of virtualization server 600. Hypervisor 616 may be used to emulate virtual hardware, partition physical hardware, virtualize physical hardware, and/or execute virtual machines that provide access to computing environments. In still other implementations, hypervisor 616 may control processor scheduling and memory partitioning for virtual machine 602 executing on virtualization server 600. Examples of hypervisor 616 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 600 may execute hypervisor 616 that creates a virtual machine platform on which guest operating systems 612 may execute. When this is the case, virtualization server 600 may be referred to as a host server. An example of such a virtualization server is Citrix Hypervisor® provided by Citrix Systems, Inc., of Fort Lauderdale, Florida.

Hypervisor 616 may create one or more virtual machines 602B-C (generally, 602) in which guest operating systems 612 execute. In some implementations, hypervisor 616 may load a virtual machine image to create virtual machine 602. The virtual machine image may refer to a collection of data, states, instructions, etc. that make up an instance of a virtual machine. In other implementations, hypervisor 616 may execute guest operating system 612 within virtual machine 602. In still other implementations, virtual machine 602 may execute guest operating system 612.

In addition to creating virtual machines 602, hypervisor 616 may control the execution of at least one virtual machine 602. The hypervisor 616 may present at least one virtual machine 602 with an abstraction of at least one hardware resource provided by virtualization server 600 (e.g., any hardware resource available within hardware layer 620). In some implementations, hypervisor 616 may control the manner in which virtual machines 602 access physical processors 626 available in virtualization server 600. Controlling access to physical processors 626 may include determining whether virtual machine 602 should have access to processor 626, and how physical processor capabilities are presented to virtual machine 602.

As shown in FIG. 6, the virtualization server 600 may host or execute one or more virtual machines 602. Virtual machine 602 may be a set of executable instructions and/or user data that, when executed by processor 626, may imitate the operation of a physical computer such that virtual machine 602 can execute programs and processes much like a physical computing device. While FIG. 6 illustrates an implementation where virtualization server 600 hosts three virtual machines 602, in other implementations virtualization server 600 may host any number of virtual machines 602. Hypervisor 616 may provide each virtual machine 602 with a unique virtual view of the physical hardware, including memory 628, processor 626, and other system resources 622, 624 available to that virtual machine 602. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 616 may create one or more unsecure virtual machines 602 and one or more secure virtual machines 602. Unsecure virtual machines 602 may be prevented from accessing resources, hardware, memory locations, and programs that secure virtual machines 602 may be permitted to access. In other implementations, hypervisor 616 may provide each virtual machine 602 with a substantially similar virtual view of the physical hardware, memory, processor, and other system resources available to virtual machines 602.

Each virtual machine 602 may include virtual disk 604A-C (generally 604) and virtual processor 606A-C (generally 606.) Virtual disk 604 may be a virtualized view of one or more physical disks 622 of virtualization server 600, or a portion of one or more physical disks 622 of virtualization server 600. The virtualized view of physical disks 622 may be generated, provided, and managed by hypervisor 616. In some implementations, hypervisor 616 may provide each virtual machine 602 with a unique view of physical disks 622. These particular virtual disk 604 (included in each virtual machine 602) may be unique, when compared with other virtual disks 604.

Virtual processor 606 may be a virtualized view of one or more physical processors 626 of virtualization server 600. The virtualized view of physical processors 626 may be generated, provided, and managed by hypervisor 616. Virtual processor 606 may have substantially all of the same characteristics of at least one physical processor 626. Virtual processor 626 may provide a modified view of physical processors 626 such that at least some of the characteristics of virtual processor 606 are different from the characteristics of the corresponding physical processor 626.

FIG. 7 illustrates an example of a method 700 for managing multimedia streams of user devices, according to some implementations of the current subject matter. The method 700 may be performed by the system 100 shown in FIG. 1 and/or systems 200, 300 shown in FIGS. 2*a*, 3*a*, respectively, using processes 210, 310 shown in FIGS. 2*b*, 3*b*, respectively. For example, the process 700 may be executed using engines 205, 305 (shown in FIGS. 2*a*, 3*a*, respectively), wherein the engine(s) may be any combination of hardware and/or software. The engine(s) 205, 305 may be incorporated into one or more devices (e.g., device 102*a*) capable reproducing one or more multimedia streams.

At 702, the engine 205 and/or 305 may determine a reproduction of one or more multimedia streams on a first computing device. The first computing device may include a user device 102*a*, as shown in FIG. 1. The multimedia streams may include an audio data stream, a video data stream, and/or any other data streams.

At 704, the engine 205 and/or 305 may be configured to detect a location of a second computing device (e.g., another user's device 102*b* and/or another device 302*b* of the user using the device 102*a*). The detection may include determining that the second computing device is positioned in an area enclosed by one or more boundaries in a plurality of boundaries. Each boundary (e.g., boundary 105, 107 as shown in FIG. 1) in the plurality of boundaries may be associated with a predetermined type of a multimedia stream in the one or more multimedia streams. For example, boundary 105 may be associated with a video data stream and boundary 107 may be associated with an audio data stream.

At 706, the engine 205 and/or 305 may be configured to execute at least one of a pausing and an unpausing of the reproduction of one or more multimedia streams on the first computing device based on the detected location of the second computing device. For example, engine may detect that another user is entering an area enclosed by boundary 107 and thus, may pause the an audio data stream being reproduced on the device 102*a*. Alternatively, or in addition to, the engine 205/305 may determine that the user's device 302*b* may be exiting an area enclosed by boundary 105 and pause a video data stream being reproduced on the device 102*a* while allowing continuous reproduction of an audio data stream on the device 102*a*.

In some implementations, the current subject matter can include one or more of the following optional features. The multimedia streams may include at least one of the following: an audio data stream, a video data stream, a graphical data stream, a text data stream, and any combination thereof.

In some implementations, the executing (e.g., at 706) may include executing at least one of the pausing and the unpausing of the reproduction of a first multimedia stream based on detecting the second computing device being located in a first area enclosed by a first boundary. The executing may also include executing at least one of the pausing and the unpausing of the reproduction of a second multimedia stream based on detecting the second computing device being located in a second area enclosed by a second boundary. The second boundary being different from the first boundary. For example, the first area may be enclosed in the second area. Alternatively, or in addition, the second area may be enclosed in the first area.

In some implementations, the executing of at least one of the pausing and the unpausing may be based on a proximity of the second computing device to the first computing device. The executing of at least one of the pausing and the unpausing may also be based on a context of one or more multimedia streams being reproduced by the first computing device.

In some implementations, the detecting (e.g., at 704) may include detecting a signal strength generated by the second computing device, and determining, based on the detected signal strength, the location of the second computing device.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    determining, using at least one processor, a reproduction of a multimedia stream on a first computing device of a first user, the multimedia stream including an audio stream and a video stream;
    detecting, using the at least one processor, a first location of a second computing device of a second user being positioned in a first area enclosed by a first boundary associated with the audio stream;
    executing, using the at least one processor, a pausing of the audio stream on the first computing device based on the detected first location of the second computing device being within the first boundary without pausing the video stream;
    detecting, using the at least one processor, a second location of the second computing device of the second user being positioned in a second area enclosed by the first boundary associated with the audio stream and a second boundary associated with the video stream; and
    executing, using the at least one processor, a pausing of the video stream on the first computing device based on the detected second location of the second computing device being within the second boundary.

2. The method according to claim 1, wherein the executing of the pausing of the audio stream is further based on a context of the multimedia stream being reproduced by the first computing device.

3. The method according to claim 1, wherein the detecting the first location includes:
    detecting a signal strength generated by the second computing device; and
    determining, based on the detected signal strength, the first location of the second computing device.

4. The method according to claim 1, wherein the first boundary and the second boundary are centered on the first computing device.

5. The method according to claim 1, further comprising:
detecting, using the at least one processor, a third location of a third computing device of the first user being positioned in the first area enclosed by the first boundary and outside the second area enclosed by the second boundary; and
executing, using the at least one processor, a pausing of the video stream on the first computing device based on the detected third location of the third computing device being within the first boundary and outside the second boundary without pausing the audio stream.

6. A computer-implemented method, comprising:
determining, using at least one processor, a reproduction of a multimedia stream on a first computing device of a first user, the multimedia stream including an audio stream and a video stream;
detecting, using the at least one processor, a first location of a second computing device of the first user being positioned in a first area enclosed by a first boundary associated with the audio stream and in a second area enclosed by a second boundary associated with the video stream;
detecting, using the at least one processor, a second location of the second computing device of the first user being positioned in the first boundary associated with the audio stream and outside the second boundary associated with the video stream;
executing, using the at least one processor, a pausing of the video stream on the first computing device based on the detected second location of the second computing device being positioned within the first boundary and outside the second boundary without pausing the audio stream;
detecting, using the at least one processor, a third location of the second computing device of the first user being positioned outside of the first boundary associated with the audio stream and the second boundary associated with the video stream; and
executing, using the at least one processor, a pausing of the audio stream on the first computing device based on the detected third location of the second computing device being positioned outside the first boundary and the second boundary.

7. A system comprising:
at least one programmable processor; and
a non-transitory machine-readable medium storing instructions that, when executed by the at least one programmable processor, cause the at least one programmable processor to perform operations comprising:
determining a reproduction of a multimedia stream on a first computing device of a first user, the multimedia stream including an audio stream and video stream;
detecting a first location of a second computing device of a second user being positioned in a first area enclosed by a first boundary associated with the audio stream;
executing a pausing of the audio stream on the first computing device based on the detected first location of the second computing device being within the first boundary without pausing the video stream;
detecting a second location of the second computing device of the second user being positioned in a second area enclosed by the first boundary associated with the audio stream and a second boundary associated with the video stream; and
executing a pausing of the video stream on the first computing device based on the detected second location of the second computing device being within the second boundary.

8. The system according to claim 7, wherein the executing of the pausing of the audio stream is further based on a context of the multimedia stream being reproduced by the first computing device.

9. The system according to claim 7, wherein the detecting the first location includes:
detecting a signal strength generated by the second computing device; and
determining, based on the detected signal strength, the first location of the second computing device.

10. The system according to claim 7, wherein the first boundary and the second boundary are centered on the first computing device.

11. The system according to claim 7, wherein the operations further comprise:
detecting a third location of a third computing device of the first user being positioned in the first area enclosed by the first boundary and outside the second area enclosed by the second boundary; and
executing a pausing of the video stream on the first computing device based on the detected third location of the third computing device being within the first boundary and outside the second boundary without pausing the audio stream.

* * * * *